United States Patent
Di Martino et al.

(10) Patent No.: US 10,760,651 B2
(45) Date of Patent: Sep. 1, 2020

(54) DEVICE FOR SYNCHRONIZATION OF A REVERSE GEAR FOR A MOTOR-VEHICLE GEARBOX

(71) Applicant: FCA Italy S.p.A., Turin (IT)

(72) Inventors: Alessandro Di Martino, Turin (IT); Marco Consani, Turin (IT)

(73) Assignee: FCA Italy S.p.A., Turin (IT)

( * ) Notice: Subject to any disclaimer, the term of this patent is extended or adjusted under 35 U.S.C. 154(b) by 589 days.

(21) Appl. No.: 15/599,549

(22) Filed: May 19, 2017

(65) Prior Publication Data

US 2017/0343080 A1     Nov. 30, 2017

(30) Foreign Application Priority Data

May 30, 2016    (EP) .................................... 16171971

(51) Int. Cl.
| | |
|---|---|
| F16H 3/08 | (2006.01) |
| F16H 3/089 | (2006.01) |
| F16H 3/12 | (2006.01) |
| F16H 3/14 | (2006.01) |
| F16H 63/30 | (2006.01) |
| F16H 57/00 | (2012.01) |

(52) U.S. Cl.
CPC ............... *F16H 3/089* (2013.01); *F16H 3/12* (2013.01); *F16H 3/14* (2013.01); *F16H 57/0006* (2013.01); *F16H 63/302* (2013.01); *B60Y 2300/19* (2013.01); *B60Y 2400/422* (2013.01); *F16H 2003/0822* (2013.01); *F16H 2200/0052* (2013.01)

(58) Field of Classification Search
CPC ... F16H 3/089; F16H 3/12; F16H 3/14; F16H 63/302; F16H 2003/0822

USPC .......................................................... 74/325
See application file for complete search history.

(56) References Cited

U.S. PATENT DOCUMENTS 3,175,413 A * 3/1965 Lucien .................... F16D 23/06
                                                               74/339
3,745,847 A     7/1973 Worner et al.
(Continued)

FOREIGN PATENT DOCUMENTS

JP       H04181046 A     6/1992

OTHER PUBLICATIONS

European Search Report dated Nov. 28, 2016, for European Application No. 16171971.1, 7 pages.

*Primary Examiner* — Ha Dinh Ho
(74) *Attorney, Agent, or Firm* — RMCK Law Group, PLC

(57) ABSTRACT

Described is a device for synchronization of a reverse gear for a vehicle gearbox including: a support shaft fixed in rotation; an idle gear wheel for engagement with a first reverse gear wheel on a gearbox primary shaft and a second reverse gear wheel on a gearbox secondary shaft, said idle gear wheel mounted rotatable and axially slidable on said support shaft and having a hub including a first friction surface; and a synchronizer ring mounted mobile on said support shaft along an axial travel and countered axially by an elastic element along said axial travel, said synchronizer ring having a second friction surface for engagement with said first friction surface. Axial movement of the idle gear wheel towards an engagement position of the reverse gear causes drawing of the synchronizer ring implementing, prior to reverse gear engagement, braking of rotary movement of the idle gear wheel.

12 Claims, 5 Drawing Sheets

(56) References Cited

U.S. PATENT DOCUMENTS

| | | | | |
|---|---|---|---|---|
| 4,370,896 A * | 2/1983 | Markfeld | ................ | F16D 23/04 |
| | | | | 188/70 R |
| 4,741,227 A * | 5/1988 | Yamada | ................ | B60K 17/28 |
| | | | | 188/290 |
| 4,785,681 A * | 11/1988 | Kuratsu | ................ | F16H 63/302 |
| | | | | 192/218 |
| 8,322,243 B2 * | 12/2012 | Silva | ................ | F16D 23/04 |
| | | | | 192/53.33 |
| 9,114,699 B2 * | 8/2015 | Takei | ................ | B60K 6/365 |

* cited by examiner

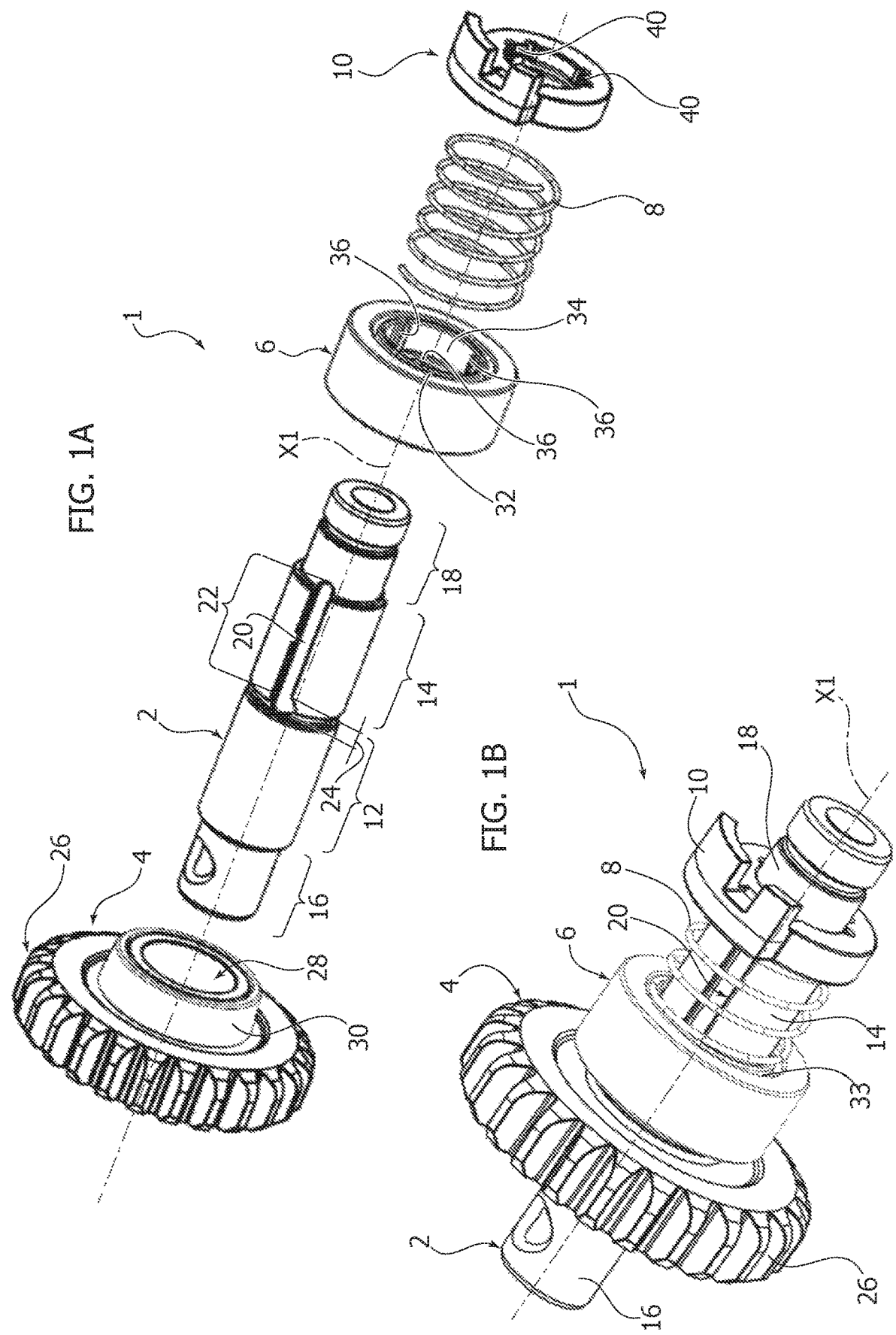

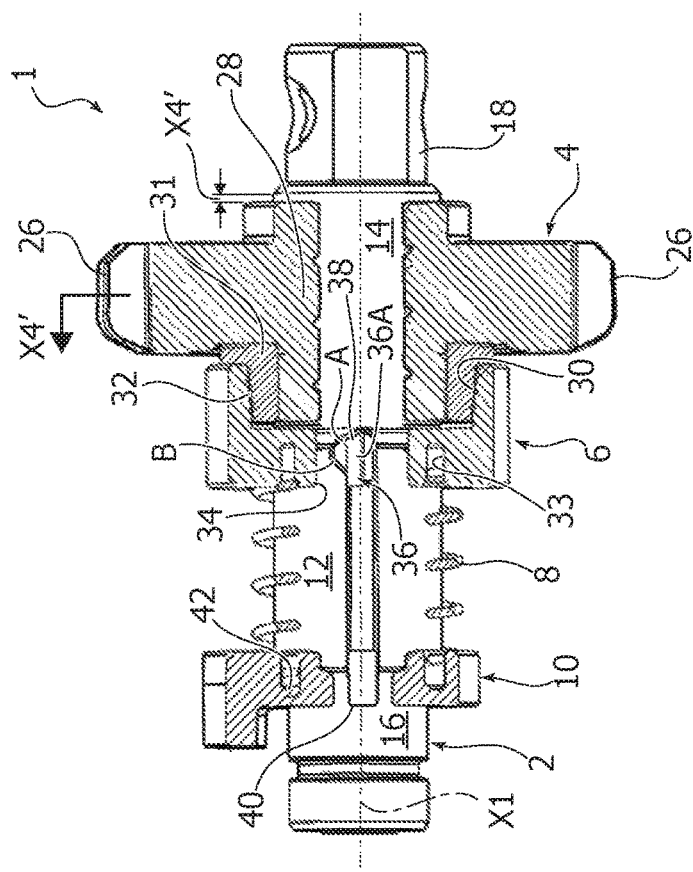
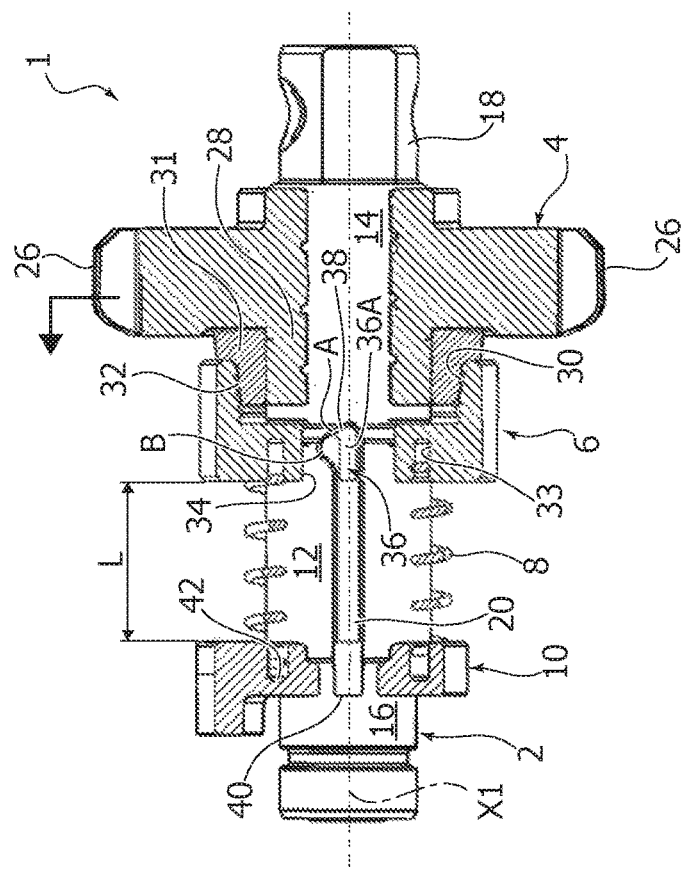

DEVICE FOR SYNCHRONIZATION OF A REVERSE GEAR FOR A MOTOR-VEHICLE GEARBOX

CROSS REFERENCE TO RELATED APPLICATIONS

This application claims priority to European Patent Application No. 16171971.1 filed on May 30, 2016, the entire disclosure of which is incorporated herein by reference.

FIELD OF THE INVENTION

The present invention relates in general to gearboxes, and in particular to devices for synchronizing the reverse gear. The invention has been developed with particular reference to a synchronization device conceived for use on a manually operated gearbox in which the reverse gear is defined by an idle gear wheel that is mounted on a support shaft and is axially movable along the latter between a first operating position in which it engages only with a first reverse gear wheel on the primary shaft of the gearbox (the meshing is permanent) and a position of engagement of the reverse gear in which it engages both with the aforesaid gear on the primary shaft and with a second reverse gear wheel on the secondary shaft.

FIELD OF THE INVENTION

In manually operated gearboxes of the type recalled above, well known is the problem of difficulty of engagement of the reverse gear in the case where this is carried out just a few instants after arrest of the vehicle or in general (once again with the vehicle stationary) immediately following upon a disconnection of the primary shaft from the engine owing to an opening of the clutch when the primary shaft, for various reasons, were to be turning at a speed higher than the minimum rotational speed of the engine.

In these circumstances, the secondary shaft of the gearbox has a speed of rotation that is certainly zero in so far as it is connected in rotation to the wheels of the vehicle—which are stationary—via the final reduction gear and the differential.

Conversely, in the conditions referred to above, the primary shaft may have a speed of rotation other than zero on account of its inertia of rotation. Typically, after arrest of the vehicle (and/or after disconnection from the engine), the primary shaft proceeds with its own travel since it is not connected in rotation to the secondary shaft and since, a few instants before, it was first connected in rotation to the engine.

Since the idle gear wheel of the reverse gear generally engages with the first reverse gear wheel on the primary shaft, also this will possess a speed of rotation of its own other than zero, namely other than the speed of rotation of the second reverse gear wheel on the secondary shaft.

Upon engagement of the reverse gear, the idle gear wheel is displaced axially along the support shaft in such a way that its toothing comes to engage with the toothing of the second reverse gear wheel that is located on the secondary shaft, albeit maintaining engagement with the gear on the primary shaft.

Given that the secondary shaft does not rotate, the presence of a non-zero speed of rotation of the idle gear wheel will inevitably lead to a series of impacts between the teeth, with a consequent grinding noise that speeds up wear of the gears themselves.

The patent literature regarding technical solutions that counter the above problem makes available a wide range of examples of devices aimed at creating conditions of synchronization of the speeds of the shafts of the gearbox upon engagement of the reverse, which, however, presupposes implementation of considerable structural modifications on the gearbox itself, which are generally not compatible with the structure of gearboxes already under production.

Furthermore, since the above modifications are so considerable, they are evidently of a rather complex design and, in the ultimate analysis, of little interest, at the level of costs, for large-scale production.

OBJECT OF THE INVENTION

The object of the present invention is to solve the technical problems mentioned previously. In particular, the object of the invention is to provide a device for engagement of the reverse gear that will enable synchronization of the speeds of the shafts of the gearbox and will enable engagement of the reverse, without any sticking or clashing between the teeth, and that will at the same time be very simple and convenient to implement on a traditional scheme of manually operated gearbox of a known type. In particular, as regards the latter aspect, the object of the present invention is to provide a device that will be contained structurally and functionally around the support shaft of the idle gear wheel, without affecting other parts or shafts of the gearbox.

SUMMARY OF THE INVENTION

The object of the present invention is achieved by a synchronization device and by a gearbox having the characteristics that form the subject of the ensuing claims, which form an integral part of the technical disclosure provided herein in relation to the invention.

In particular, the object of the invention is achieved by a device for synchronization of a reverse gear for a motor-vehicle gearbox comprising:
  a support shaft, fixed in rotation;
  an idle gear wheel configured for engagement with a first reverse gear wheel on a primary shaft of a gearbox and to a second reverse gear wheel on a secondary shaft of the gearbox, said idle gear wheel being mounted freely rotatable and axially slidable on said support shaft and having a hub including a first friction surface; and
  a synchronizer ring mounted movable on said support shaft along an axial travel and axially countered by means of an elastic element along said axial travel, said synchronizer ring having a second friction surface configured for engagement with said first friction surface, said synchronizer ring being moreover constrained angularly with respect to the support shaft so that it varies according to the position thereof along the axial travel,
  wherein the idle gear wheel includes a first operating position along said support shaft associated to a condition of disengagement of the reverse gear, and a second operating position along said support shaft, associated to a condition of engagement of the reverse gear,
  wherein moreover:
  during operation, when an engagement manoeuvre of the reverse gear is carried out, said idle gear wheel can be moved axially along said support shaft from the first operating position to the second operating position, with axial traction of said synchronizer ring along said axial travel, said traction including an engagement of said first friction surface and said second friction surface; and during traction and before the second operating position of said idle gear wheel is reached, said synchronizer ring is configured for braking a rotary movement of said idle gear wheel by means of engagement of said first friction surface and said second friction surface.

Furthermore, the object of the invention is achieved by a manually operated motor-vehicle gearbox, the gearbox including:

a primary shaft having a longitudinal axis;
a secondary shaft having a longitudinal axis;
a first reverse gear wheel on said primary shaft and a second reverse gear wheel on said secondary shaft; and
a synchronization device according to the invention, wherein said support shaft has a longitudinal axis parallel to the longitudinal axes of said primary shaft and said secondary shaft, and the idle gear wheel is mounted constantly engaging with said first reverse gear wheel and can be moved axially along the support shaft for engaging with said second reverse gear wheel in the second operating position, defining the reverse gear.

BRIEF DESCRIPTION OF THE DRAWINGS

The invention will now be described with reference to the annexed drawings, which are provided purely by way of non-limiting example and in which:

FIG. 1A is an exploded perspective view of a device according to a preferred embodiment of the invention, while FIG. 1B is a perspective view in assembled form of the device of FIG. 1A;

FIGS. 3 to 7 illustrate different successive steps of an operating sequence of the device according to the invention.

DETAILED DESCRIPTION

Figure 2A:
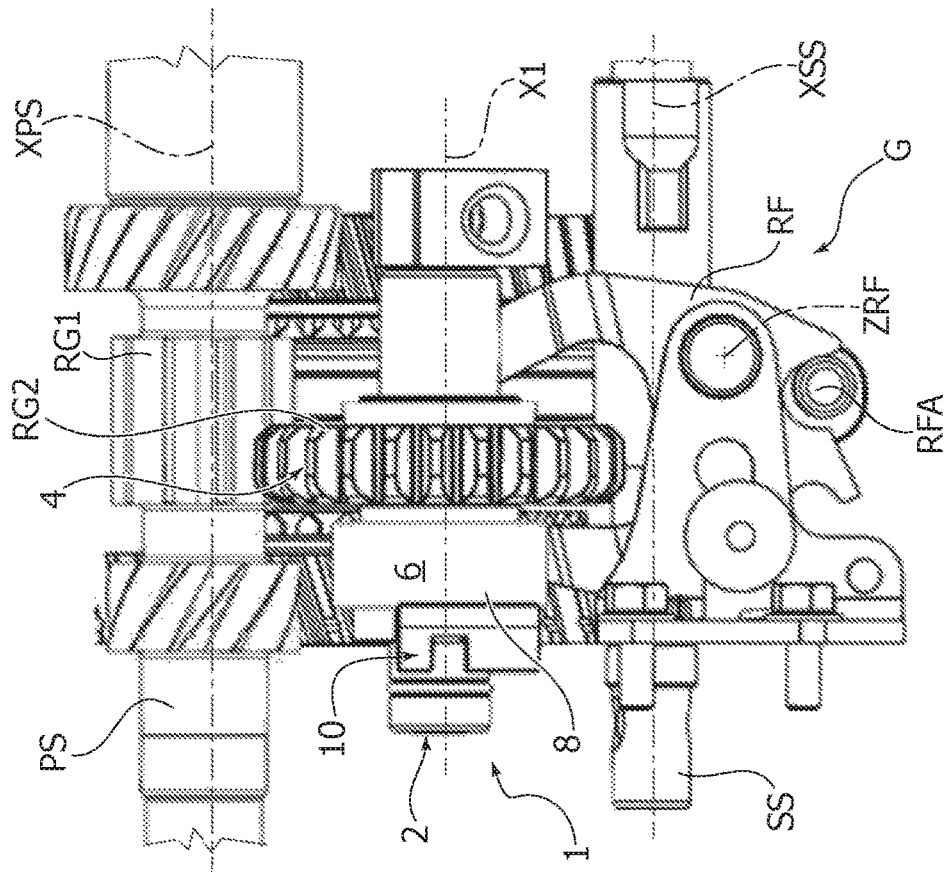
FIGS. 2A and 2B illustrate two portions of a motor-vehicle gearbox according to the invention, represented in which is the device according to the invention in a first operating condition (FIG. 2A) and in a second operating condition (FIG. 2B)

With reference to FIG. 1A, a device for synchronization of a reverse gear according to a preferred embodiment of the invention is designated as a whole by the reference number 1. The device 1 includes a support shaft 2 with longitudinal axis X1 fixed in rotation, an idle gear wheel 4 that forms part of the reverse gear of a gearbox, and a synchronizer ring 6. The idle gear wheel is mounted freely rotatable and axially mobile on the shaft 2 and is coaxial thereto. The synchronizer ring 6 is mounted axially slidable on the support shaft 2 along an axial travel L (once again coaxial thereto) and is countered axially along the travel L by means of an elastic element 8, which abuts both upon the ring 6 and upon a reference ring 10.

The support shaft 2 is fixed in rotation with respect to the axis X1 and includes a first intermediate portion 12 and a second intermediate portion 14, and a first end portion 16 and a second end portion 18. The end portions 16 and 18 serve for assembly of the support shaft 2 within the casing of a manually operated motor-vehicle gearbox, whereas the portions 12 and 14, which both have a diameter greater than that of the portions 16, 18, have the function of providing fitting of the idle gear wheel 4 and the synchronizer ring 6, as will now be described.

Provided on the second intermediate portion 14 are three axial grooves 20 set at the same angular distances of 120° apart. Each axial groove 20 includes a first portion 22 having a first width, and a second portion 24, set at one end of the groove 20, having a second width, larger than the width of the stretch 22.

As may be noted from FIG. 1A, each groove 20 extends substantially throughout the stretch 14, moreover even reaching areas of interface with the stretch 12 and the stretch 18 that correspond to a circumferential groove and to a shoulder, respectively. The stretch with larger width 24 extends partially within the groove that separates the stretches 14 and 12.

The idle gear wheel 4 includes a toothing 26 with straight teeth (and flanks rounded on the meshing side) and a hub 28, which includes a first friction surface 30. Preferably, the peripheral friction surface corresponds to the outer surface of a collar 31 that is applied by force fit on the hub 28 (in some embodiments it is possible for the collar 31 to be made of a single piece with the idle gear wheel 4). Once again preferably, the friction surface 30 has a conical geometry.

The synchronizer ring 6 has a band width including a first portion, provided on which is a second friction surface 32 complementary to the friction surface 30. The surface 32 extends axially between a first end of the ring 6 and the end of the first portion of the band width. A second end of the ring 6 is provided with an annular groove 33 with large axial development, which is configured for receiving the elastic element 8, both in the extended/elongated configuration and, as will be seen hereinafter, in the collapsed (packed) configuration.

Provided in a second portion of the band width designated by the reference number 34 are three teeth 36 configured for being housed within corresponding axial grooves 20.

With reference for example to FIG. 3, each tooth 36 is substantially boot-shaped (or, equivalently, L-shaped) and includes a first portion 36A having a third width smaller than the width of the portion 22 of the groove 20, and a foot 38, which has a fourth width substantially identical to the width of the portion 22 (and hence smaller than the width of the portion 24), but has an oblique side A configured for interaction with a further oblique side B that forms part of the portion of larger width 24 of the groove 20.

The elastic element 8 is preferably provided as cylindrical helical spring, which is fitted with play around the portion 14 of the support shaft 2. The spring 8 has a first end that abuts on the synchronizer ring 6, and in particular is housed within the annular groove 33, and a second end that abuts on the reference ring 10. The latter includes three radial teeth 40 configured for engaging within corresponding axial grooves 20, fixing the angular position of the ring 10 with respect to the shaft 2, and moreover includes an annular groove 42 preferably identical to the groove 33 that receives the second end of the elastic element 8. This means that also the groove 42 has a large axial development (in relative terms) and is configured for receiving the elastic element 8, both in the extended/elongated configuration and, as will be seen hereinafter, in the collapsed (packed) configuration.

The lock ring 10 is configured for abutting on the shoulder that divides the portions 12 and 16 of the support shaft 2 and is moreover kept in position by abutting on the casing of the gearbox.

As may be seen in FIG. 1B, in the assembled condition, the idle gear wheel 4 is located in the proximity of the end 16 of the support shaft 2 and, with reference to FIG. 3, the synchronizer ring 6 is substantially in contact with the friction surface 30 and held there by the elastic element 8.

The latter is in the extended condition and spaces the ring 10 apart from the synchronizer ring 6 for an axial amount L that corresponds to the total axial travel of the idle gear wheel 4 and of the synchronizer ring 6.

Operation of the synchronization device according to the invention will now be described with the aid of FIGS. 3 to 7 and FIGS. 2A and 2B.

With reference to FIG. 2A, the synchronization device 1 is installed on a manually operated motor-vehicle gearbox G, including a primary shaft PS having an axis of rotation XPS and a secondary shaft SS having an axis of rotation XSS parallel to the axis XPS.

The support shaft 2 is, in particular, located in a position that is substantially intermediate with respect to the axes XPS and XSS in such a way that the axis X1 defines with the axes XPS and XSS a triangle with vertices X1, XSS, XPS. All the aforesaid axes are parallel to one another.

The idle gear wheel 4 is set so as to be constantly engaged with a first reverse gear wheel RG1 fitted on the primary shaft PS, or provided integrally therewith, and is pre-arranged for being moved axially by means of a fork RF, the prongs of which are set straddling the idle gear wheel 4 itself.

The fork RF is articulated about an axis ZRF, orthogonal to the axis X1, and about the axes XPS, XSS, and is in turn controlled through a pin with a spherical head RFA, on which there engages a mechanism that comes under the set of forked elements, in which there selectively engages the engagement finger of a device for selection and engagement of the gear ratios of the gearbox, which is per se known, and is connected to an operating lever within the passenger compartment.

FIG. 2A illustrates a first operating position of the idle gear wheel 4, which corresponds to a condition of disengagement of the reverse gear. In this condition, there occurs meshing between just the gears 4 and RG1, whereas the idle gear wheel 4 does not engage with the gear RG2.

Figure 2B:
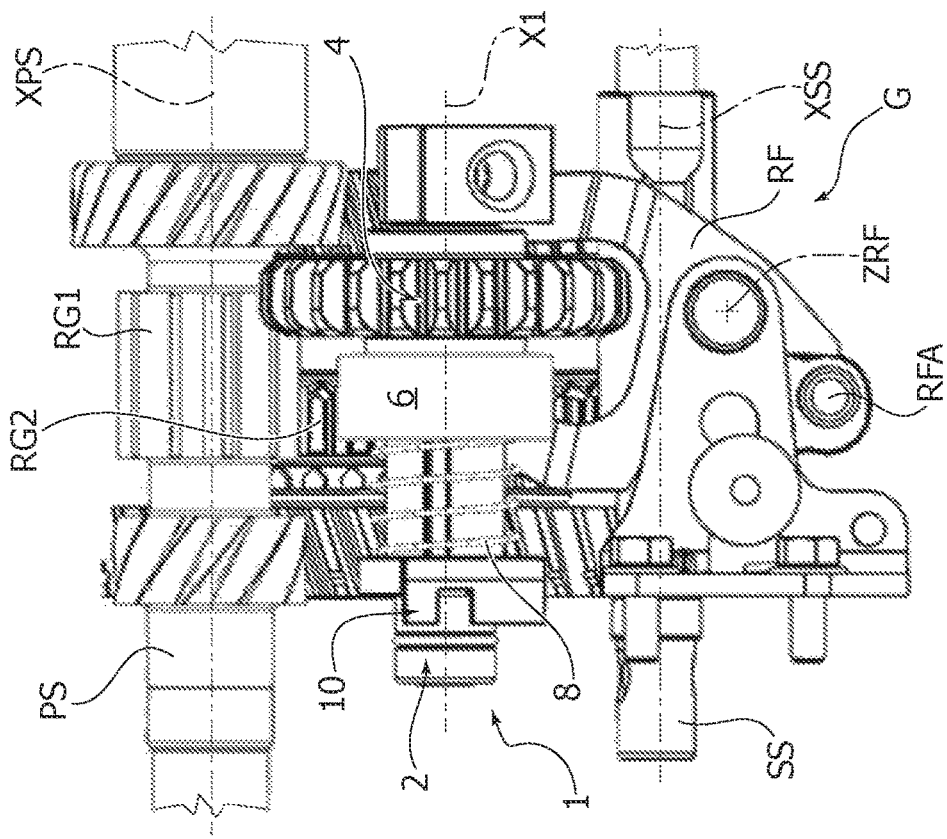

FIG. 2B illustrates a second operating position of the idle gear wheel 4, corresponding to a condition of engagement of the reverse gear, where the idle gear wheel 4 has been translated axially along the shaft 2 (towards the left in the figure) in such a way as to reach the condition of meshing with the gear RG2, maintaining meshing with the gear RG1. The latter, for this purpose, has a band width sufficient to cover the axial travel of the idle gear wheel 4 so as to maintain meshing during movement.

FIG. 3 is a cross-sectional view of the representation of FIG. 2A. In this condition (which corresponds to any condition of forward movement of the vehicle or to conditions immediately prior to an engagement manoeuvre of the reverse gear) there is a relative motion between the friction surfaces 30 and 32 since the idle gear wheel 4 is driven in rotation by the gear RG1 connected to the primary shaft PS, whereas the synchronizer ring 6 cannot follow the movement of rotation thereof on account of engagement between the grooves 20 and the teeth 36, which in this position of the ring 6 with respect to the grooves 20 allows only a limited angular displacement. In this connection, from the functional standpoint, the synchronizer ring is angularly constrained to the support shaft 2 in a way that is variable as a function of the position of the ring along the axial travel L.

In particular, in a first stretch of the axial travel L of the synchronizer ring 6, coupling in rotation of the synchronizer ring 6 with the support shaft 2 includes a circumferential play that enables a relative angular movement between them. The first stretch corresponds to the amount of the travel L in which the position of each tooth 36 within the corresponding groove 20 is such that the tooth 36 is not completely contained within the portion 22.

In a second stretch of the axial travel L, subsequent to the first stretch, coupling in rotation of the synchronizer ring 6 with the support shaft 2 is substantially rigid. The second stretch corresponds to the amount of the travel L in which the position of each tooth 36 within the corresponding groove 20 is such that the tooth 36 is completely contained within the portion 22 in such a way that the substantial equality of width between the foot 38 and portion 22 will prevent any angular displacement of the ring 6 with respect to the shaft 2.

With reference to FIG. 3, the synchronizer ring 6 is in the first stretch of the axial travel L: here, in particular, the teeth 36 are all set straddling the portions 22 and 24. The position of the teeth 36 is such that there is a circumferential play that enables a relative angular movement between the synchronizer ring 6 and the support shaft 2, which, however, is of modest degree.

The circumferential play results from the difference between the width of the tooth 36 in the portion 36A and the width of the portion 22. It should be noted that in this condition, in fact, the foot 38 is not able to condition the possibility of relative movement between the synchronizer ring 6 and the support shaft 2 since it is located in the portion of larger width 24, and moreover in an area where there is no engagement with the groove 20. In fact, in this area the groove 20 has walls of very modest height since they traverse the groove between the portions 12 and 14.

FIG. 4 corresponds to a step immediately subsequent to start of an engagement manoeuvre of the reverse gear. FIG. 4 illustrates a condition in which the idle gear wheel 4, which has been moved axially along the shaft 2 by means of the fork RF, has covered a first stretch X4' of the respective axial travel that has an amplitude sufficient to ensure approach and engagement between the friction surfaces 30 and 32, without there being generated any significant transmission of torque between them. This is a so-called pre-synchronization step, and the movement substantially affects the idle gear wheel 4 alone, it being necessary to envisage in the limit a movement of negligible degree of the synchronizer ring 6 merely by elastic compensation (the synchronizer ring 6 is countered by the element 8, as has been said) of consolidation of the contact between the friction surfaces.

Figure 5:
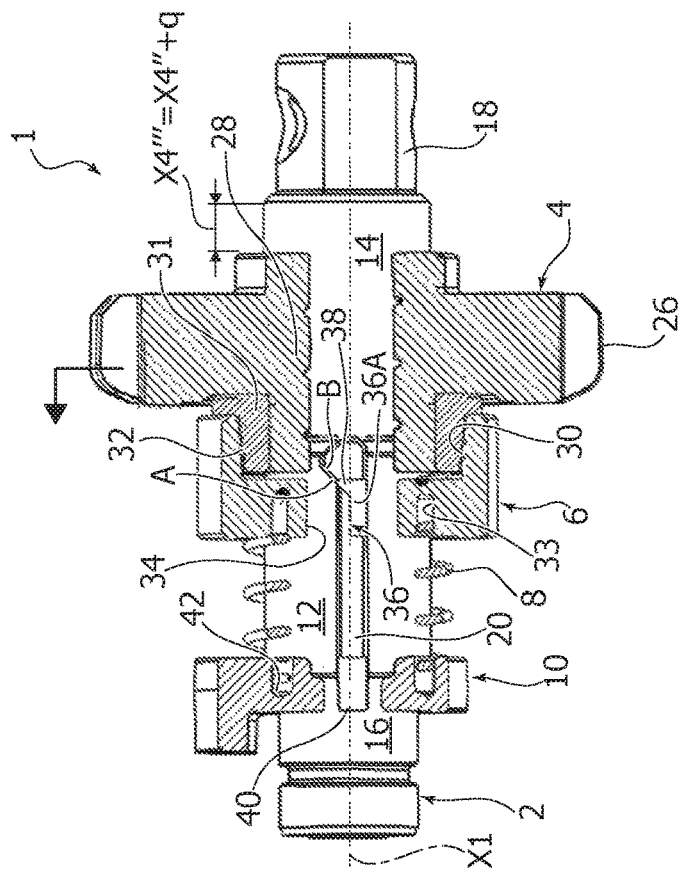

FIG. 5 illustrates a further step of continuation of the movement of the idle gear wheel 4 towards the second position (position of engagement of the reverse gear), and in particular shows the synchronization step proper.

This step is characterized in that the idle gear wheel 4 has now covered a distance X4" that is equal to the travel X4', plus an overtravel p corresponding to the distance necessary for tightening the engagement between the sides A and B of the foot 38 and of the portion 24. It should be noted that the axial movement of the idle gear wheel 4 causes an axial drawing of the synchronizer ring 6 along the shaft 2, in particular along the respective axial travel L, against the action of the element 8.

During drawing of the ring 6, at the interface between the friction surfaces 30 and 32 there is exerted an axial force that is a direct consequence of the force exchanged between the sides A and B (the elastic pre-loading of the element 8 makes a negligible contribution given that it purely has the function of positioning of the ring 6).

It is thanks to exchange of this axial force that there is transmission of tangential forces between the surfaces 30 and 32 capable of stopping the rotary motion of the idle gear wheel 4 with respect to the support shaft 2 and moreover stopping rotation of the primary shaft PS with which the idle gear wheel 4 is coupled in rotation by meshing with the gear RG1. Furthermore, it should be noted that arrest of the rotary motion thereof occurs during traction of the ring 6 before the second operating position of the idle gear wheel 4 is reached.

It should be noted that the braking action is rendered effective both by the friction between the surfaces 30 and 32 and by the fact that the tooth 36 moreover bears upon the side wall of the groove 20, a further proof of the fact that the possibilities of relative movement between the synchronizer ring 6 and the shaft 2 are very limited, and beyond the maximum angular displacement, the synchronizer ring 6 is substantially rigidly coupled in rotation to the shaft 2.

Moreover, pre-arrangement of the oblique sides A and B prevents the engagement manoeuvre of the reverse gear, i.e., the axial movement of the idle gear wheel 4, from proceeding any further as long as synchronization is in progress.

In this connection, in order to obtain complete braking, with arrest of the idle gear wheel 4 at the end of synchronization, it is necessary for the angle of inclination of the side A (and consequently of the side B) to be chosen so as to satisfy a specific relation with the angle of opening (or semi-opening, as preferred) of the surface 32 of the ring 6. If the angle of inclination of the side A respects this condition (in view the angles typical for this application, there may be considered an angle A of 90° measured with respect to the axis X1 in the projection of FIGS. 3 to 7; in general, the may can depend upon the materials adopted, as well as upon the conditions of lubrication), then there is the guarantee of the so-called absoluteness of the manoeuvre, namely the guarantee of a complete arrest of the rotary motion of the idle gear wheel 4 before the sides A of the feet 38 pass beyond the sides B of the grooves 20, as will shortly be described.

Figure 6:
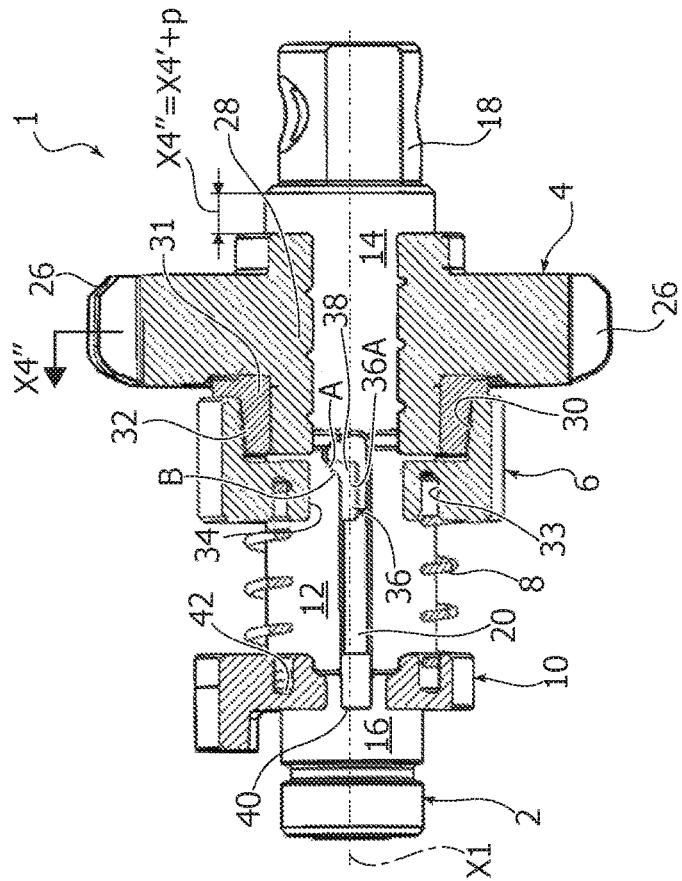

With reference to FIG. 6, the idle gear wheel 4 is now translated with respect to the resting condition by an amount X4''' equal to the sum of the amount X4'', plus an overtravel q that corresponds to the axial travel necessary for the foot 38 to pass definitively beyond the side B. FIG. 6 corresponds to the so-called indexing step, which follows the synchronization step. In this situation, there no longer exists any relative speed between the support shaft 2 and the idle gear wheel 4, and it is consequently possible, owing to the consequent reduction of the force that tightens the contact between the sides A and B, to get the side A to pass beyond the side B by simply proceeding with the axial displacement of the idle gear wheel 4.

It is to be noted that, as occurs in traditional synchronizers for idle gear wheels of a motor-vehicle gearbox, the overtravel requires the idle gear wheel 4 to undergo a small angular displacement in a direction opposite to the direction in which it was moving prior to synchronization. The reason for this is that the engagement between the surfaces 30 and 32 is still moderately tight, and in effect the ring 6 and the idle gear wheel 4 behave—in regard to the forces involved—substantially as a single body.

In the example presented in the figure, if the shaft is viewed from the end 18, the direction of rotation of the idle gear wheel 4 prior to synchronization is clockwise (note where the contact is closed between the tooth 36 and the side walls of the groove 20) whereas the rotation of the idle gear wheel 4 necessary for each tooth 38 to pass beyond the corresponding side B is counterclockwise.

Figure 7:
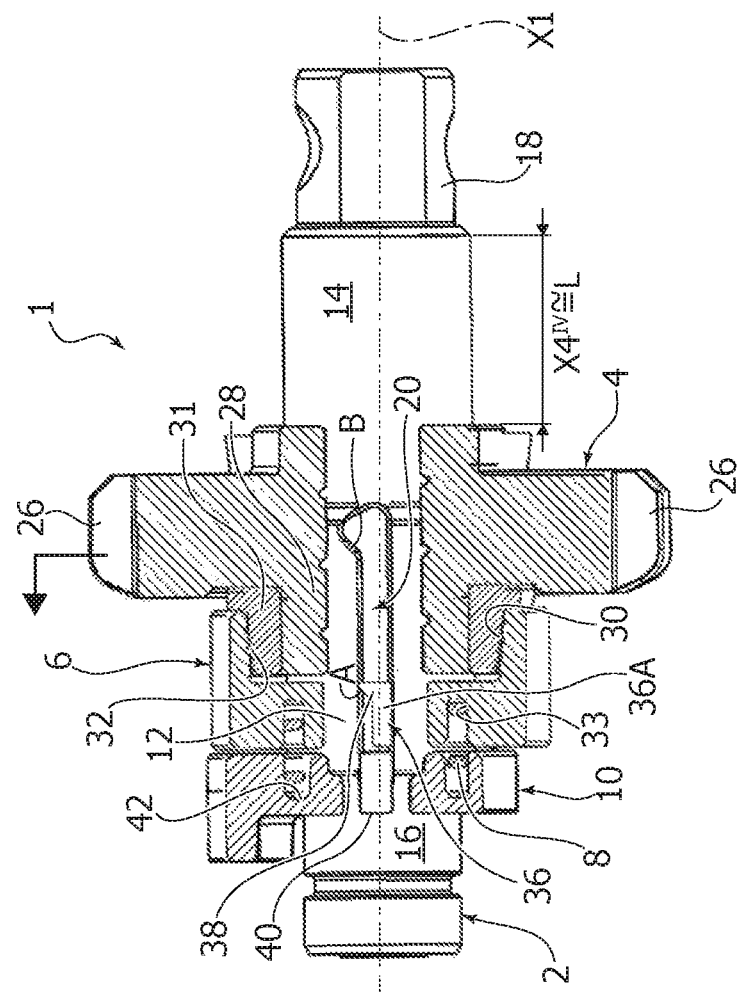

Following upon indexing, as may be seen again in FIG. 6 and in the next FIG. 7, the synchronizer ring 6 loses any possibility of relative movement with respect to the support shaft 2. In fact, as may be seen from FIGS. 6 and 7, what governs coupling in rotation between them is now the width of the foot 38, which is substantially identical to the width of the portion 22 within which the foot 38 is located. The condition of FIG. 7 corresponds to an axial travel $X4^{IV}$ of the idle gear wheel 4 substantially corresponding to the amount L (but for the small initial idle travel necessary for recovering the axial play between the ring 6 and idle gear wheel 4 and for consolidating engagement of the surface 30 and 32).

In the condition of FIG. 7, the spring 8 substantially packed tight between the spacer ring 6 and the lock ring 10, which—on account of the axial extension of the grooves 33 and 42—can remain in contact with one another, holding the spring 8 between them. In this connection, according to an advantageous aspect of the invention, the overall axial extension of the annular groove 42 on the reference ring 10 and of the annular groove 33 on the synchronizer ring 6 is equal to or greater than the packed length of the elastic element 8 in such a way that it will be completely contained within the annular grooves once the axial travel L of the synchronizer ring 6 has been completed (both in the case of packed compression and in the case of a compression of more modest degree).

In this condition, there exists, instead, relative motion between the surfaces 30 and 32. In fact, the only axial force exerted on the interface between them consists in the elastic pre-loading of the element 8 since there is no further source of axial force in the absence of contact between the sides A and B or even just in the absence of actuation of the fork element RF. Since the device 1 is immersed in the oil of the gearbox G and since a film of oil may have been created in the meantime between the surfaces 30 and 32 (which may be provided with circumferential grooves to favour their detachment), the idle gear wheel 4 can turn, enabling the vehicle to reverse.

Upon disengagement of the reverse, return to the resting position illustrated in FIG. 3 is ensured by the elastic element 8, which in particular keeps the synchronizer ring 6 substantially in contact with the hub of the idle gear wheel 4.

The person skilled in the art will certainly appreciate from the foregoing description the great simplicity and the advantages inherent in the device 1. The latter is, in fact, entirely defined and contained within the third axis of the gearbox, i.e., within the ensemble that normally enables engagement of the idle gear wheel 4.

The support shaft 2 and the idle gear wheel 4 are in fact already components commonly used on manually operated gearboxes, so that the only further elements that are required for implementation of the device 1 consist in the synchronizer ring 6, in the hub with friction surface 30 of the idle gear wheel 4, in the reference ring 10, and in the elastic element 8. Added to this is the machining of the grooves 20 on the support shaft 2, which in any case does not require further adaptations with respect to the geometry already in use.

Furthermore, the action of synchronization is automatic and progressive with the engagement manoeuvre of the reverse gear, and is entirely provided by the device 1 only along the axis X1, not requiring the action of further mechanisms, synchronizers, of other forward gear ratios, or extraneous devices for being implemented (except for the fork RF).

There is hence no need to resort to pre-synchronization of other forward gear ratios, as occurs in known solutions, simply because everything is contained in the device 1.

Of course, the details of construction and the embodiments may vary widely with respect to what has been described and illustrated herein, without thereby departing from the scope of protection of the present invention, as defined by the annexed claims.

For instance, an alternative embodiment differs from that described and illustrated so far in that the grooves 20 have, in the first portion 22, a width greater than the width of the foot 38, the aim being to enable, even when synchronization has occurred, a minimum freedom of relative movement between the synchronizer ring 6 and the support shaft 2. This has the aim of enabling in any case a relative movement between the idle gear wheel 4 and the support shaft 2 in the case where the resulting engagement between the ring 6 and the idle gear wheel 4 following upon synchronization were to be so firm as not to allow relative movement between the friction surfaces 30 and 32, and hence between the idle gear wheel 4 and the synchronizer ring 6, which in the embodiment described previously and in the position in question is substantially rigidly connected in rotation to the shaft 2.

This enables the idle gear wheel 4, in the case where it were to stick against the teeth of the second reverse gear wheel RG2 on the secondary shaft SS, after synchronization and upon engagement proper, to turn in one direction or in the other by an angle sufficient to intercept a slot between the teeth of the gear RG2 and successfully complete engagement of the reverse.

In yet a further alternative embodiment, there is envisaged shaping of the oblique side of the foot 38 with an angle smaller than the value that guarantees absoluteness of the manoeuvre (namely—by way of example—an angle of less than 90° for the application considered; again the angle may depend upon the materials adopted and the conditions of lubrication), i.e., arrest of the rotation of the idle gear wheel 4 at the end of synchronization (condition represented in FIG. 5). In particular, the inventors have noted that, unlike traditional synchronizers mounted on the primary and/or secondary shafts of gearboxes, the synchronizer ring 6 moves along the axial travel L, which is very wide as compared to the axial travels typical of the aforesaid synchronizers. The result is that it is possible to shape the foot 38 in such a way that, at the moment of transition from the condition of FIG. 5 to that of FIG. 6, there is not obtained complete arrest of the idle gear wheel 4 (and of the primary shaft PS), but only a partial braking, substantially assigning the final slowing-down to zero speed to the natural degradation of angular momentum that takes place in the time interval necessary to cover the amount of axial travel between the position of FIG. 5 and the position of FIG. 7. Even though arrest of the idle gear wheel 4 is not guaranteed during synchronization, this solution presents the advantage of being less sharp in terms of sensations transmitted to the driver of the vehicle. In particular, in this embodiment the driver does not notice in a clear-cut way the momentary sticking of the lever of the gearbox due to absolute synchronization, which instead characterizes the embodiment described previously, where the angle of inclination of the sides A and B is sized in such a way as to guarantee absoluteness of the manoeuvre.

However, to prevent any further problems of noise from arising upon engagement, at the same time maintaining absence of any sticking that may be perceived by the driver, it is possible to envisage, at the end of each groove 20, a further portion similar to the portion 24 that will offer a new oblique side for contact with the side A so as to carry out a second synchronization when the speed of rotation of the idle gear wheel 4 is close to zero and in any case guarantee absoluteness of the manoeuvre.

The invention claimed is:

1. A device for synchronization of a reverse gear for a motor-vehicle gearbox comprising:
   a support shaft, fixed in rotation;
   an idle gear wheel configured for constant engagement with a first reverse gear wheel on a primary shaft of the motor-vehicle gearbox and with a second reverse gear wheel on a secondary shaft of the motor-vehicle gearbox, said idle gear wheel being mounted freely rotatable and axially slidable on said support shaft and having a hub that includes a first friction surface;
   a synchronizer ring, which is mounted movable on said support shaft along an axial travel and is axially countered by an elastic element along said axial travel, said synchronizer ring having a second friction surface configured for engagement with said first friction surface, said synchronizer ring being constrained angularly with respect to the support shaft in a way that varies according to a position thereof along the axial travel;
   wherein the idle gear wheel includes a first operating position along said support shaft associated to a condition of disengagement of the reverse gear and a second operating position along said support shaft associated to a condition of engagement of the reverse gear
   wherein:
   during operation, when a reverse gear engagement manoeuvre is carried out, said idle gear wheel can be moved axially along said support shaft from the first operating position to the second operating position with axial drawing of said synchronizer ring along said axial travel, said axial drawing including engagement of said first friction surface and said second friction surface; and
   during the axial drawing, and before the second operating position of said idle gear wheel is reached, said synchronizer ring is configured for braking a rotary movement of said idle gear wheel by engagement of said first friction surface and said second friction surface.

2. The synchronization device according to claim 1, wherein said synchronizer ring is configured for stopping the rotary movement of said idle gear wheel by engagement of said first friction surface and said second friction surface.

3. The synchronization device according to claim 1, wherein:
   in a first stretch of the axial travel of the synchronizer ring coupling in rotation of said synchronizer ring and said support shaft includes a circumferential play that enables a relative angular movement between said synchronizer ring and said support shaft; and
   in a second stretch of the axial travel, subsequent to the first stretch, coupling in rotation of said synchronizer ring and said support shaft is rigid.

4. The synchronization device according to claim 3, wherein said support shaft includes a plurality of axial grooves, each having a first portion with a first width and a second portion with a second width larger than the first width, wherein said synchronizer ring includes a corresponding number of radial teeth configured for engaging within a corresponding one of said axial grooves.

5. The synchronization device according to claim 4, wherein each tooth of said synchronizer ring has a substantially L-shaped profile including a first portion having a third width and a second portion having a fourth width, wherein said third width is smaller than said first width, and said fourth width is substantially identical to said first width.

6. The synchronization device according to claim 4, wherein each tooth of said synchronizer ring has a substantially L-shaped profile including a first portion having a third width and a second portion having a fourth width, wherein said third width is smaller than said first width, and said fourth width is smaller than said first width.

7. The synchronization device according to claim 5, wherein said second portion of the radial tooth of the synchronizer ring includes an oblique side configured for bearing upon a corresponding oblique side of said second portion of the axial groove, wherein, during traction of the synchronizer ring, a tightening of the contact between the oblique sides of each radial tooth of the synchronizer ring and of the axial groove is configured for implementing an exchange of axial forces between said first and second friction surfaces that brings about arrest of the rotary motion of said idle gear wheel.

8. The synchronization device according to claim 1, wherein said elastic element abuts on a reference ring axially fixed and mounted on said support shaft, wherein provided in each said synchronizer ring and said reference ring is an annular groove that extends axially and is configured for receiving said elastic element.

9. The synchronization device according to claim 7, wherein an overall axial extension of the annular groove on the reference ring and of the annular groove on the synchronizer ring is equal to or greater than a packed length of the elastic element in such a way that the elastic element is completely contained within the annular grooves once the axial travel of the synchronizer ring has been completed.

10. The synchronization device according to claim 1, wherein said first friction surface and said second friction surface are conical.

11. A manually operated motor-vehicle gearbox, the gearbox including:
 the primary shaft having a longitudinal axis;
 the secondary shaft having a longitudinal axis;
 a synchronization device according to claim 1, wherein said support shaft has a longitudinal axis parallel to the longitudinal axes of said primary shaft and secondary shaft, and the idle gear wheel is mounted so that it constantly engages with said first reverse gear wheel and can be moved axially along the support shaft for meshing with said second reverse gear wheel in the second operating position, thus defining the reverse gear.

12. The gearbox according to claim 11, wherein said idle gear wheel can be moved axially by a fork element articulated about an axis orthogonal to the longitudinal axis of said support shaft.

\* \* \* \* \*